United States Patent
Kapur et al.

(10) Patent No.: US 7,418,166 B1
(45) Date of Patent: Aug. 26, 2008

(54) DEVICE AND APPROACH FOR INTEGRATION OF OPTICAL DEVICES AND WAVEGUIDES THEREFOR

(75) Inventors: Pawan Kapur, Palo Alto, CA (US); Yu-Hsuan Kuo, Taipei (TW); Michael West Wiemer, Los Altos, CA (US); David A. B. Miller, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/710,624

(22) Filed: Feb. 23, 2007

Related U.S. Application Data (60) Provisional application No. 60/776,264, filed on Feb. 24, 2006.

(51) Int. Cl.
*G02B 6/12* (2006.01)
*G02B 6/10* (2006.01)

(52) U.S. Cl. .......... 385/14; 385/130; 385/131; 438/29; 438/31; 438/41; 216/2; 257/432

(58) Field of Classification Search .......... 438/22, 438/27, 29, 31, 39, 41; 385/14, 129–132; 216/2; 257/432
See application file for complete search history.

(56) References Cited

U.S. PATENT DOCUMENTS 5,013,682 A * 5/1991 Plumton et al. ......... 438/489

2006/0124919 A1 6/2006 Harris, Jr. et al.
2007/0087507 A1 4/2007 Liu et al.
2007/0104441 A1 * 5/2007 Ahn et al. .......... 385/129

FOREIGN PATENT DOCUMENTS

WO WO2005/094254 A2 10/2005

OTHER PUBLICATIONS

Yaocheng Liu, Michael D. Deal and James D. Plummer, "High-quality single-crystal Ge on insulator by liquid-phase epitaxy on Si substrates." *Applied Physics Letters* 84 (2004), p. 2563-2565.

* cited by examiner

*Primary Examiner*—Sung Pak
*Assistant Examiner*—Daniel Petkovsek
(74) *Attorney, Agent, or Firm*—Crawford Maunu PLLC (57) ABSTRACT

Optical devices having integrated waveguide and active areas are realized using a crystallization approach involving the inhibition of defects typically associated with liquid-phase crystalline growth of lattice mismatched materials. According to one example embodiment, a growth region is formed such that the region is isolated from a silicon portion of silicon material. The region extends from a silicon-based seeding area of the substrate. A semiconductor material is deposited on a Silicon-based seeding area and in the growth region. A single crystalline material is formed from the deposited semiconductor material by heating and cooling the deposited semiconductor material while directing growth of the semiconductor material from the Silicon-based seeding area and through an opening sufficiently narrow to mitigate crystalline defects. A light-communicating device is formed by etching the silicon material over an insulator layer and etching the single crystalline material.

20 Claims, 7 Drawing Sheets

DEVICE AND APPROACH FOR INTEGRATION OF OPTICAL DEVICES AND WAVEGUIDES THEREFOR

RELATED PATENT DOCUMENTS

This patent document claims the benefit, under 35 U.S.C. § 119(e), of U.S. Provisional Patent Application No. 60/776,264 filed on Feb. 24, 2006 and entitled: "Integration of Quantum Well Modulators, Detectors and Lasers with SOI Waveguides for Optical Interconnects."

FEDERALLY-SPONSORED RESEARCH AND DEVELOPMENT

This invention was made with Government support under contracts N66001-04-1-8916 awarded by the Defense Advanced Research Projects Agency (DARPA), HR0011-05-1-0007 awarded by the Department of Defense (DOD), and by contract W911NF-05-1-0251 awarded by the U.S. Army RDECOM Acquisition Center. The U.S. Government has certain rights in this invention.

FIELD OF THE INVENTION

The present invention is directed to optical semiconductor devices and, more specifically, to devices having self-aligned optical devices and waveguides.

BACKGROUND

Optical communication provides a number of benefits over other forms of communication. For instance, optical signals using optical fibers provide a number of advantages over electrical signals using conductive wires. A few example advantages include increased bandwidth, reduction in signal degradation over long distances, elimination of electromagnetic cross talk and similar interference, increased data security, ease of installation and avoiding ground loop and similar electrical problems.

Moreover, optical signals can potentially generate lower heat during transmission. Heat can be a major problem with high-speed electrical transmissions on dense integrated circuits (ICs).

While optical communication is currently employed for transmission between devices, the devices typically include ICs that are electrical in nature. For instance, a processor implemented using a silicon-based semiconductor produces electrical signals representing a desired communication. To realize the advantages of optical communications, the electrical signals need to be converted to light and transmitted to the optical fiber or other optical transmission media such as optical waveguide. The same is true for the receipt of optical signals by the processor, in that the optical signals are converted to electrical signals.

Silicon is used in many ICs because it has a number of advantageous properties including cheap cost, existing fabrication techniques and factories, ease of fabrication and the extensive knowledge of its properties in the industry. At common optical communication frequencies (e.g., 1.55 micron) silicon is nearly transparent. Thus, while silicon based structures are capable of routing the light using waveguides, they are not very efficient at producing, modulating and detecting optical signals at wavelengths larger than about 1.1 micron.

A specific type of waveguide is a silicon-on-insulator (SOI) waveguide. Modulators and detectors coupled to waveguides are preferred to surface normal configurations in dense interconnect applications and for use with the low available voltage swings from many silicon circuits. Further, SOI waveguides are prevalent and preferred for their ease of manufacturing, very low intrinsic absorption at near infra-red communication wavelengths, and high mode confinement enabling high density and sharp turns. In addition, a substantial know-how exists regarding the use of SOI waveguides, such as methods for coupling to external fibers and for other passive optical functions. Thus, a monolithic integration of active Si compatible optical modulators, detectors and generators with SOI waveguides is desirable. More specifically, the integration of quantum well modulators and detectors (e.g., bulk and quantum well detectors, primarily PIN, but also MSMs) with SOI waveguides would, depending on the application, directly impact the cost structure, performance, reliability, and/or form factor for communication within an integrated circuit, between chips on a board, between boards over a backplane, within a local area network (LAN) (e.g., Ethernet), and over long-haul distances.

Extensive efforts have been made to integrate active optical devices with Si waveguides using hybrid techniques. Examples of such efforts include attaching and aligning individual pre-fabricated detectors, modulators, and lasers in III-V semiconductors to a silicon waveguide. The need for precise alignment of these active components with the silicon waveguide and the additional bonding step necessary to affix them complicate such efforts.

In addition, there have been efforts to grow germanium directly on silicon to be used as detection elements. These and other processes often require multiple, complicated growth steps, including a long-high temperature anneal phase. The processes can lead to significant SiGe inter-diffusion and large thermal budget and poor throughput in a CMOS fabrication. Moreover, the reported defect density of the so-grown germanium is still large, which is detrimental for its performance.

The above and other difficulties have been challenging to the implementation of optical devices for use in a variety of semiconductor applications.

SUMMARY

The present invention is directed to the above and related types of optical circuit devices and their manufacture. The present invention is exemplified in a number of implementations and applications, some of which are summarized below.

According to an example embodiment of the present invention, a method is implemented for monolithically integrating and coupling a light detector and modulator with an SOI waveguide for the transmission of light. Starting from a silicon-on-insulator (SOI) substrate, a portion of silicon on top of an insulator layer is removed to expose the insulator layer. A protective insulating layer is created to protect the exposed silicon including the sides of the silicon-on-insulator layer. A portion of the exposed insulator layer is removed to expose a silicon substrate. A semiconductor material having favorable optical qualities, such as, but not limited to, germanium, potentially possessing a non-crystalline quality, is deposited on the exposed insulating layer and the exposed silicon substrate and can be subsequently patterned into a specific shape if so desired. A crucible dielectric film encapsulating the semiconducting film is deposited. The deposited semiconductor material is transformed into a single-crystal film by heating and cooling the deposited semiconductor material to grow the single-crystal film from a seeding location at the exposed silicon. Optionally, the crucible layer may then be removed. The silicon-on-insulator layer is etched to produce a silicon-on-insulator waveguide. The single-crystal film is etched to create an active area for communicating light passing through the silicon-on-insulator waveguide.

According to another example embodiment of the present invention, a method is implemented for manufacturing a silicon-on-insulator (SOI) semiconductor device for one of detecting, modulating and emitting light. The SOI device includes a silicon material over an insulator layer which in turn is over a Si-based substrate. The method includes forming a growth region that is isolated from a silicon portion of the silicon material over the substrate, and that extends from a silicon-based seeding area. A semiconductor material is deposited on the Silicon-based seeding area and in the growth region and may be patterned according to a desired shape. This is followed by the deposition of a crucible layer encapsulating the just deposited semiconductor material. A single crystalline material is formed from the deposited semiconductor material by heating and cooling the deposited semiconductor material while directing the crystal growth of the semiconductor material from the Silicon-based seeding area and through an opening sufficiently narrow to mitigate crystalline defects. A light-communicating device is formed having a waveguide portion aligned with a portion of the single crystalline material by etching the silicon material over an insulator layer and etching the single crystalline material.

According to another example embodiment of the present invention, a method of manufacturing a light-communicating semiconductor device is implemented. A portion of an insulating layer is exposed by removing a silicon portion of a silicon layer of a silicon-on-insulator wafer, leaving an exposed portion of the silicon layer. A protective insulating layer is created over the exposed silicon layer. A portion of a silicon substrate is exposed by removing a portion of the insulating layer exposed by the step of exposing a portion of an insulating layer. A semiconductor material is deposited and patterned on the exposed portion of the insulating layer and the exposed portion of the silicon substrate. A crucible dielectric film encapsulating the semiconducting material is deposited. The deposited semiconductor is transformed into a single crystal film by heating and cooling the deposited semiconductor material. A light path is created that includes an SOI waveguide and a portion of the single crystal film by simultaneously etching the silicon layer and the single crystal film.

According to various embodiments of the presenting invention, after the creation of a single crystal material, and before or after etching it, there is an option to create different functions using subsequent growth of similar or dissimilar films on the existing single crystal films, such as creating quantum wells using subsequent growth, and doping of the single crystal film. This allows for the formation of more complicated optical devices including, but not limited to, quantum well modulators and detectors. Other possibilities include various P, I and N junctions that can be used to form photodiodes and the like. In a particular instance, the deposited semiconductor material is Germanium allowing for the creation of Germanium and silicon-germanium-based quantum well diodes using subsequent growth and for the creation of other semiconductor-based devices from the growth of lattice matched materials, such as GaAs.

According to another embodiment of the present invention, a SOI device is manufactured that represents an intermediate phase of manufacturing a silicon-on-insulator (SOI) semiconductor device for one of detecting, modulating and emitting light. The device includes a silicon material over an insulator layer which in turn is over a Si-based substrate and a crucible dielectric layer within the silicon material over an insulator layer and encapsulating a single crystal material that extends from a silicon seeding location thorough a narrow opening in the crucible dielectric layer. The narrow opening is sufficiently small to mitigate crystalline defects in the single crystal material.

According to other aspects, certain embodiments of the present invention are useful in developing a light-communicating semiconductor device that includes a silicon-on-insulator waveguide to direct light from a first end of the silicon-on-insulator waveguide to a second end of silicon-on-insulator waveguide. The device also has an active region with a single-crystal semiconductor material, such as germanium, adjacent to the first end of the silicon-on-insulator waveguide and electrical contacts interfacing with the active region.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of applications benefiting from single-crystalline-type structures, and has been found to be particularly useful for optical semiconductor circuits employing single-crystalline substrate materials and the manufacture thereof. While the present invention is not necessarily limited to such approaches, various aspects of the invention may be appreciated through a discussion of various examples using this context.

Consistent with one example embodiment of the present invention, active optoelectronic devices are integrated with silicon-on-insulator (SOI) waveguides. An active/passive substrate is provided having laterally defined active and passive regions. Lithographic patterning of the active/passive substrate provides light communicating devices (e.g., lasers, modulators and/or detectors) in the active regions that are self-aligned with passive devices (e.g. optical waveguides) in the passive regions. The active/passive substrate can be formed by defining active regions and passive regions on an SOI substrate, followed by providing active epitaxial material in the active regions. The active material can be provided by depositing amorphous active material in contact with a Si region of the SOI substrate followed by melt-regrowing of the active material to make it single-crystal. Melting of the active material can be accomplished using a number of suitable techniques including rapid-thermal-annealing (RTA) and laser melting. Further epitaxial growth can be performed on top of the single-crystal material, though this is not always necessary to make optical devices. In this manner, the Si part of the SOI substrate can act as a "seed" for crystal growth of the active material. Alternatively, the active material can be provided by direct epitaxial growth of active material on Si in the active regions. In either case, the active material may or may not be lattice matched to silicon. For further details regarding example melt-regrowth techniques that can be used to create single crystal films, reference can be made to "Cyrstalline-type Device and Approach Therefor" by PCT Patent Application Publication No. WO 2005/094254 A2, Oct. 13, 2005, "High-quality single-crystal Ge on insulator by liquid-phase epitaxy on Si substrates", Applied Physics Letters, Apr. 5, 2004, Volume 84, Issue 14, pp. 2563-2565, both by Yaocheng Liu, et al. and both fully incorporated herein by reference.

A further aspect of the invention includes reducing loss by increasing the distance between an optical waveguide mode and an electrical contact (e.g., by altering waveguide geometry), and/or by providing a semiconducting contact layer and/or by providing a transparent carbon nanotube based metal contact. Another aspect of the invention is provision of an index matching material in a gap between an active device and a passive waveguide in cases where this gap is non-negligible, and/or designing the gap to have a quarter-wave or half-wave optical thickness, in order to reduce coupling loss.

Turning now to the figures, FIGS. 1A-1F depict stages in a process flow for integration of active regions on a SOI wafer, according to an example embodiment of the present invention. Starting with an SOI wafer (a thin silicon layer 104 on insulator 102 and usually on silicon substrate 100), the process includes etching a hole or growth region 106 in the thin silicon layer 104, stopping on the insulator layer 102 beneath it. In one instance, this is followed by a dielectric deposition or growth 109 to protect the top surface and exposed sidewall silicon from subsequent epitaxy and etching steps. Examples of dielectrics can be $SiO_2$, SiN or other silicon compatible materials. This protective layer 109 is shown as covering the layer of sidewall silicon exposed in creating the growth region 106; however, the protective layer 109, in general, could be blanket deposited over the entire silicon layer 104 and exposed portion of insulator 102. This blanket covering can be particularly useful for ease of manufacture, more specifically; the protective layer can be easily applied to a broad area without implementing steps necessary to limiting the application to the exposed silicon. The protective layer is generally useful to ensure that the semiconductor material 110 only contacts the silicon at a selected seeding location. This is useful for controlling the crystallization, including the mitigation of defects due to lattice mismatches between the semiconductor material and the material at the seeding location and the mitigation of silicon diffusion into the semiconductor material and vice versa. Accordingly, the protective layer may also be implemented by etching of semiconductor material 110 away from contact points other than the selected seeding location. A smaller hole 108 within this large hole 106 is etched in the bottom oxide layer 102 stopping on the bottom single-crystal substrate 100, which can be silicon. This is followed by deposition of a semiconductor material 110, which can be Si, Ge, any combination thereof (SiGe), or other desired semiconductors (e.g., type III-V, IV and combinations thereof). Such a deposition may result in the deposited material being amorphous.

According to one embodiment of the present invention, a high-germanium-concentration SiGe layer, approaching pure germanium is deposited. The film deposition is followed by patterning the film such that it is contained within the larger hole 106. This can be achieved, for example, by etching, lift-off or other techniques well known to people in the art. Part of the amorphous film goes through the smaller hole 108 and touches single crystal silicon 100 at the bottom of the hole. This is followed by a deposition of crucible dielectric layer which encapsulates the deposited 110 layer. One example of the crucible layer can be $SiO_2$. Using the bottom silicon as a seed layer, a melt re-growth technique is used on the deposited film to transform it into a single crystal film. This can be achieved using techniques such as rapid melt growth (RMG) or liquid phase epitaxy (LPE). The seeding layer underlying the insulator layer of the SOI substrate could be any one of a number of suitable single-crystal materials; however, in the preferred embodiment, it is silicon.

Next, epitaxial growth of PIN diode 112 is performed on the single-crystal material. This PIN diode may contain a SiGe quantum well structure (modulator, detector) in the intrinsic region or just bulk Ge or SiGe (detector). In an alternative embodiment, an NIN structure or a PIP structure may be grown instead, with such alternate structures being particularly useful for photoconductive photodetectors; the I regions in such photoconductive structures may also be replaced with a lightly doped N region in the NIN structures or a lightly doped P region in the PIP structure. These structures can be implemented as vertical layer structures, and such a structure is often preferable for a quantum well modulator. It is also possible that the PIN, NIN and PIP structures be formed laterally, within one layer, by doping as appropriate with techniques well known to people in the art such as ion implantation. Such PIN, NIN and PIP structures all provide ways of applying an electric field to the intrinsic region for modulating the light absorption and/or collecting photocurrent from the intrinsic region. PIN or PN structures can also be used to inject electrons and holes for semiconductor lasers or light emitting diodes, and NIN structures also permit the flowing of current through the structure as required for quantum-cascade laser structures.

Epitaxial growth may be omitted and instead the crystallized layer itself may be used to implement optical functionality such as photodetection. In this case, the various doped structures can be implemented using techniques such as ion implantation well known to those in the art.

The dopings in all of these structures can be either in-situ or created later with techniques known to people in the art, such as implantation well. Reversing the order of the above steps such that the deposited layer is etched after crystallization or even after epitaxial growth is also a possibility. The structure can subsequently be used as is or can be planarized using techniques well known to people in the art, such as chemical mechanical polishing (CMP).

Figure 1A:
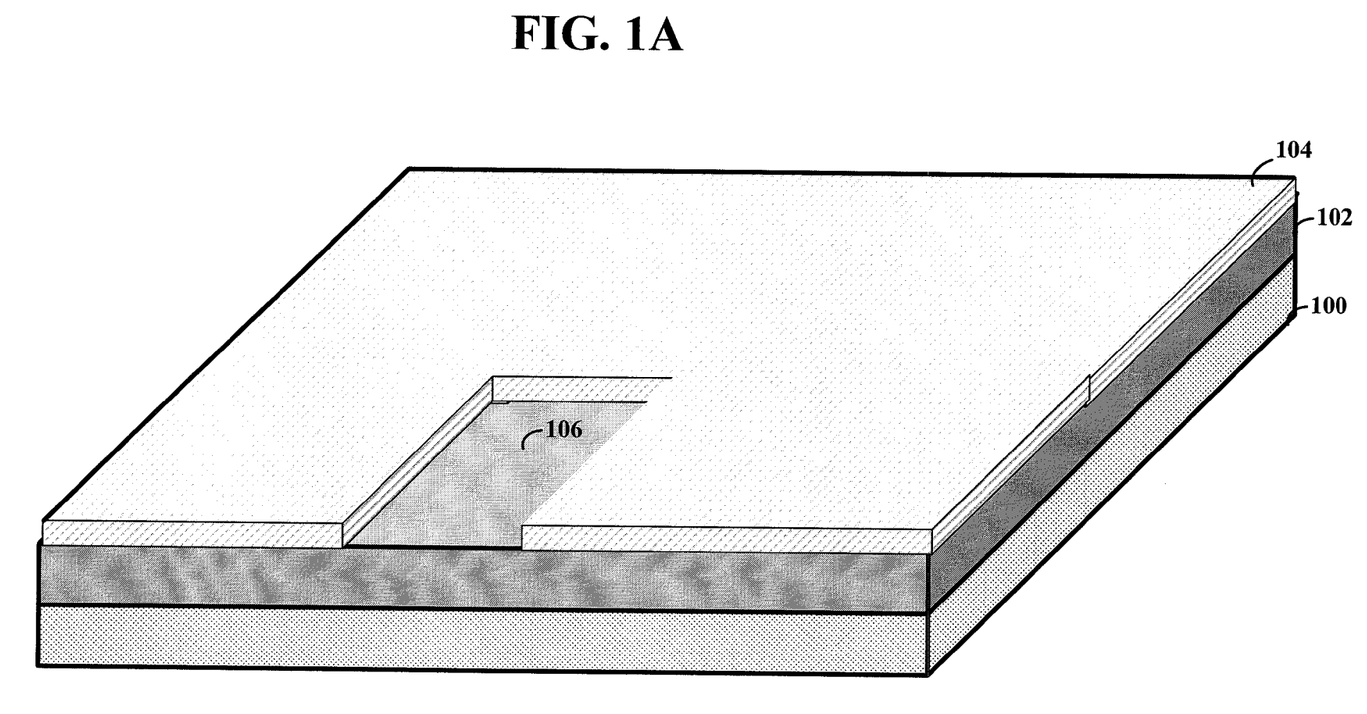
FIGS. 1A-1F depict steps in a process flow for integration of active regions on a SOI wafer, according to an example embodiment of the present invention.
Figure 1B:
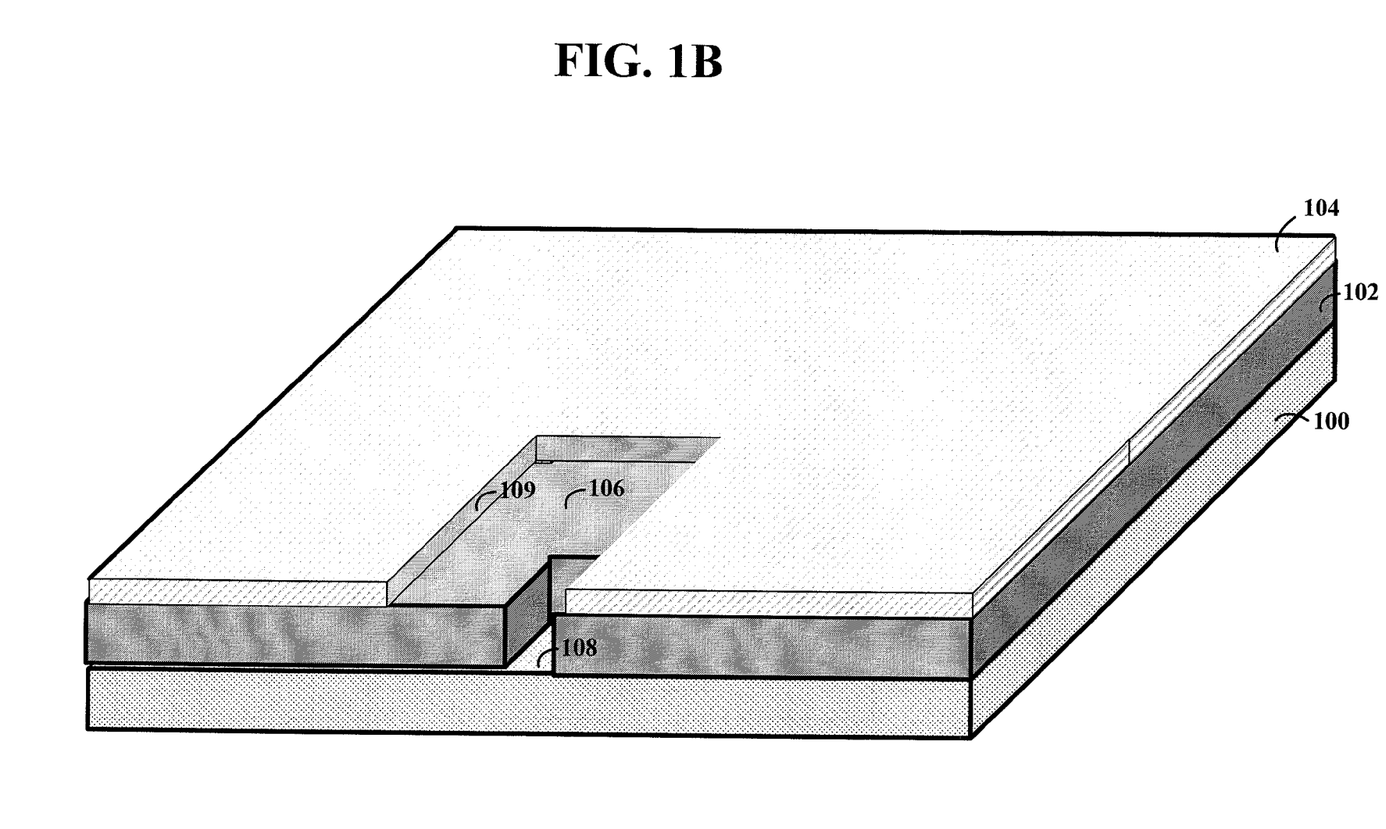
Figure 1C:
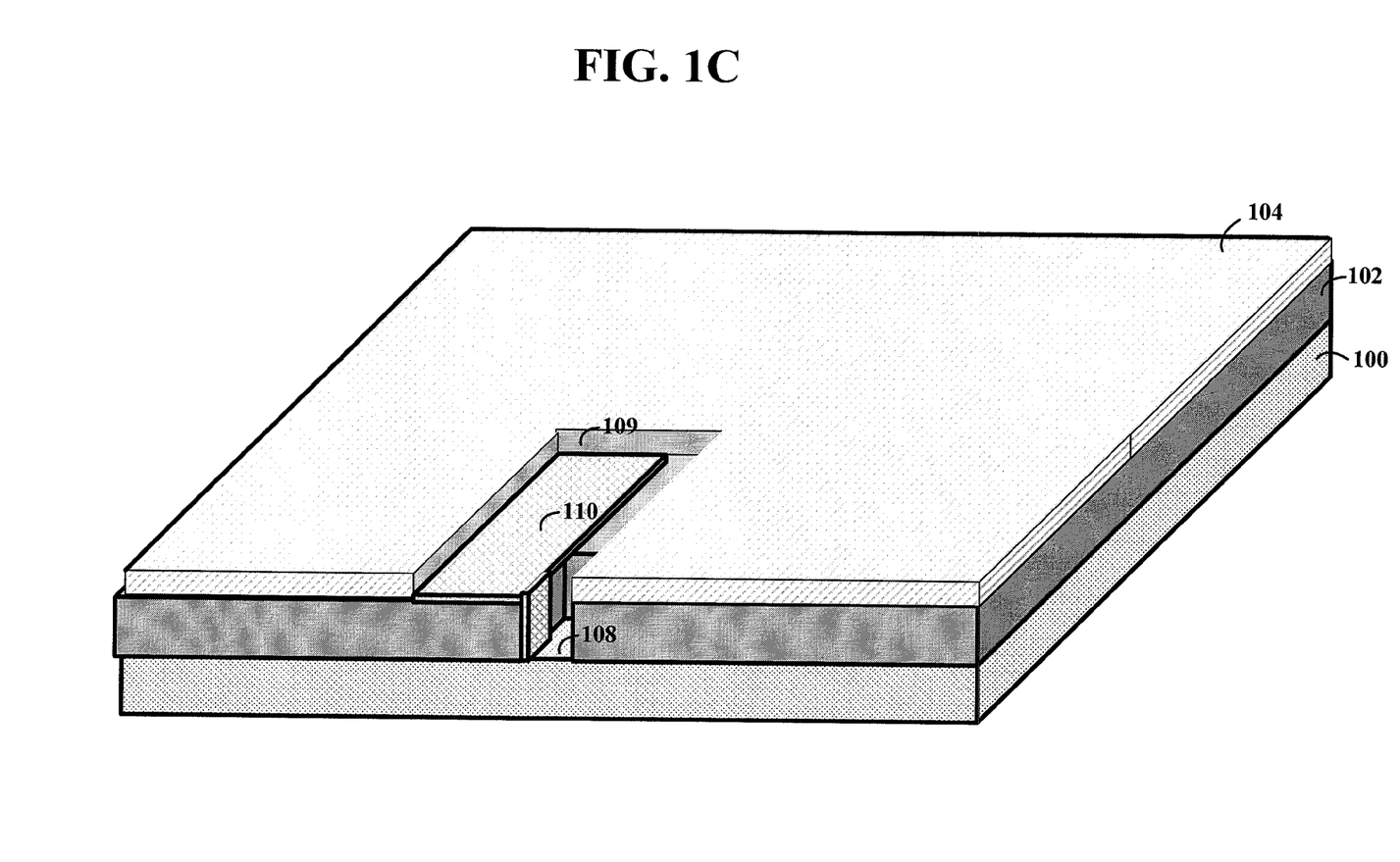
Figure 1D:
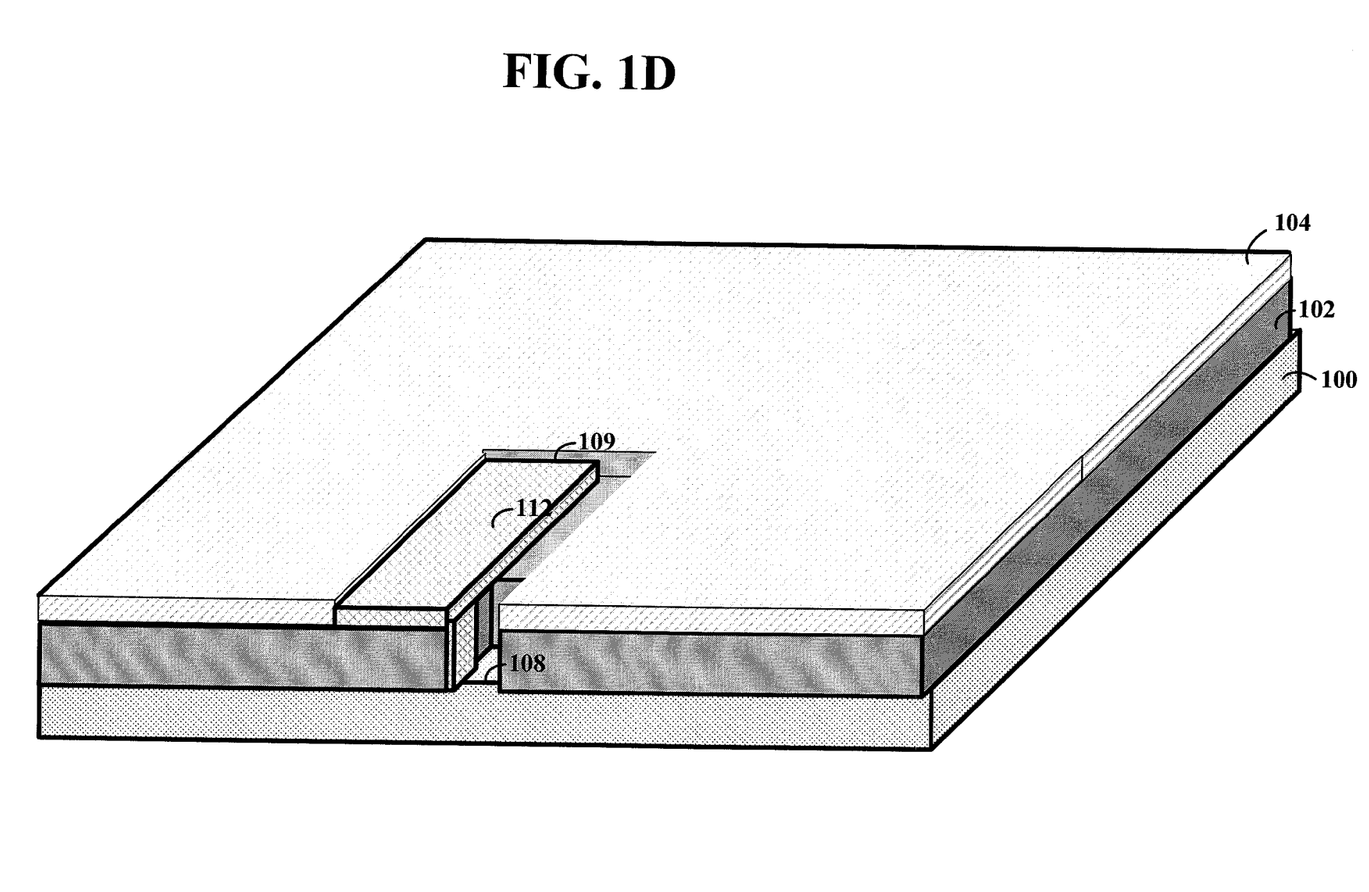
Figure 1E:
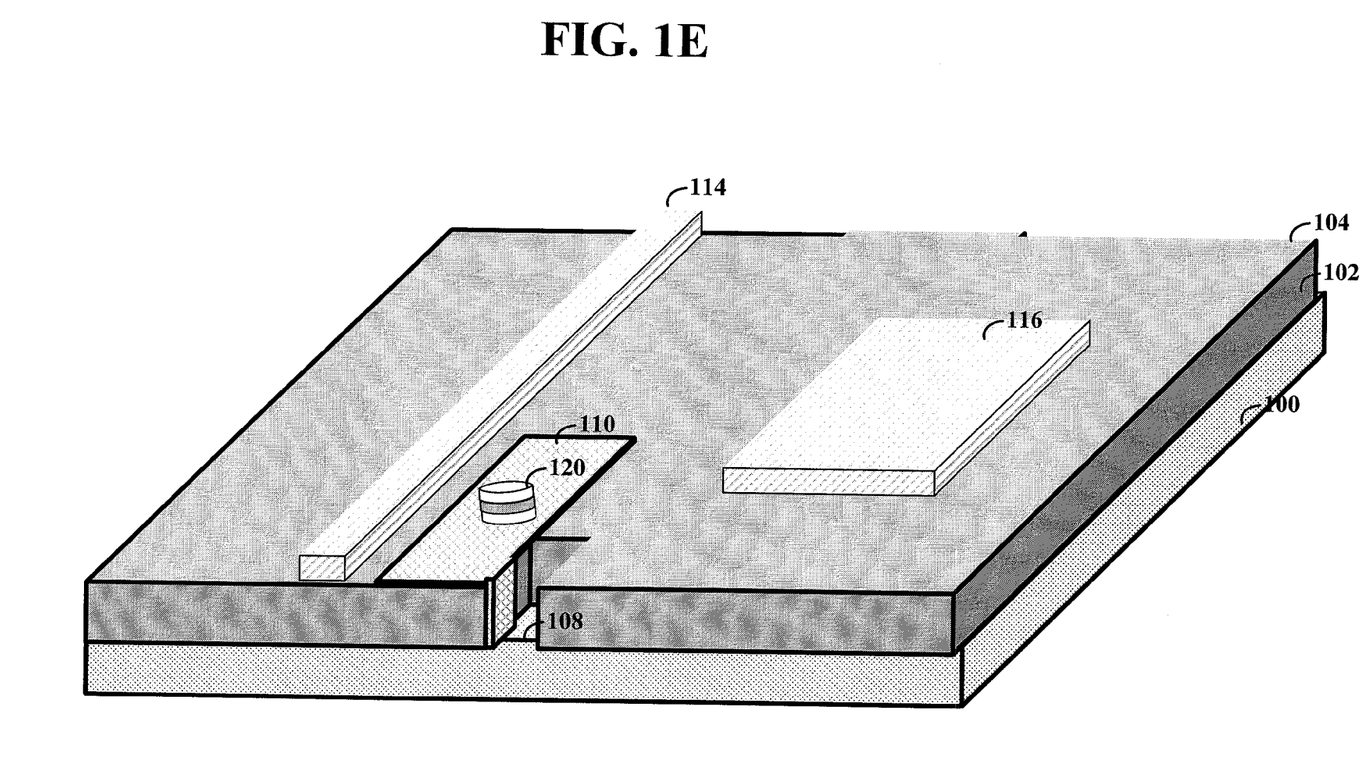
Figure 1F:
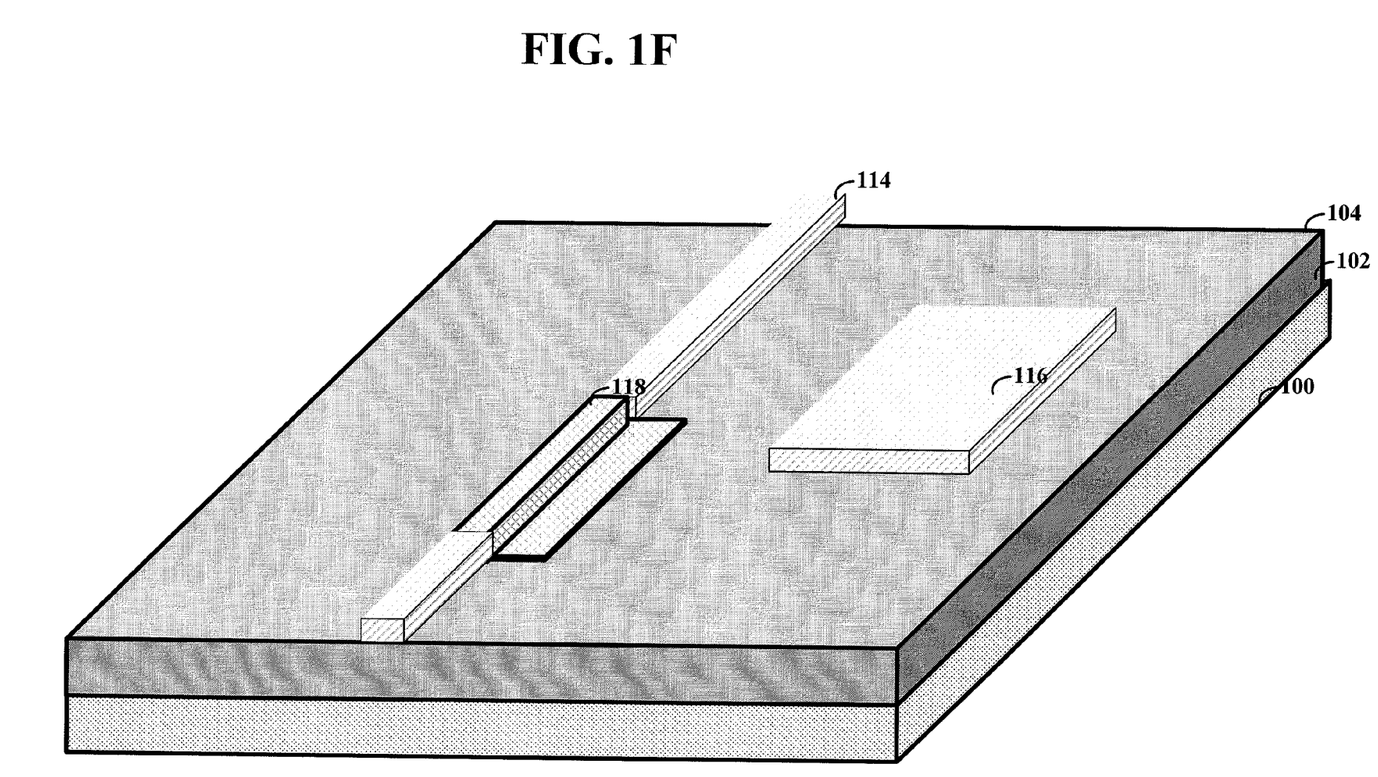

Finally, according to one embodiment, a waveguide 114 is patterned simultaneously through the silicon and the active (modulator, detector) area and then etched, giving horizontally self-aligned, butt-coupled active SiGe 118 and passive SOI waveguides 114, as shown by FIG. 1F, or ring-oscillator-coupled, as shown by FIG. 1E. A mildly selective etch of germanium to Si, can yield a bottom "foot" area for contacting the bottom-doped region of the high germanium concentration SiGe PIN diode. Alternatively, the passive and active areas can be defined by different pattern and etch steps, using very precise alignment between the steps. This is followed by active and waveguide area passivation, waveguide cladding deposition, contact etch, metal deposition, and patterning. The waveguides can be either rib or strip as is well known to those skilled in the art. This method is particularly useful for generating a very thin single crystal SiGe layer on insulator. This is especially important because of the limited vertical height budget for maintaining single transverse mode operation within the waveguide and the need to accommodate an entire PIN stack in that height. It also allows for highly efficient coupling between the SOI waveguide and the SiGe waveguide/detector/modulator due to their similar thicknesses and horizontally self aligned nature.

A variation on this method is to perform a direct heteroepitaxy from the bottom silicon seed rather than to first deposit amorphous germanium and crystallize it. All defects will be terminated in the smaller hole through necking, while the over layer of SiGe will be a good quality single crystal material. Once a good quality single crystal layer is formed on the insulator, this variation will subsequently follow similar process steps as above.

The aforementioned method describes SiGe with varying germanium concentration including pure germanium seeding from the bottom single crystal material (silicon) below the insulator, for crystallization. However, a process seeding SiGe from the top silicon of the SOI substrate, above the insulator, is also feasible. This would involve removing the deposited protective layer selectively at the top silicon to form a seeding hole at the top only, and repeating the germanium deposition and crystallization steps described herein. Additionally, seeding from an exposed sidewall of the silicon layer is also feasible, thereby avoiding the necessity of etching down to the underlying silicon substrate, and also allowing the possibility of this invention being practiced on SOI structures in which silicon is not the underlying substrate material.

A specific example of the resulting device may be used for modulation or detection. A laser is coupled into an SOI waveguide, which couples seamlessly into the waveguide modulator, which in turn butt-couples to another SOI waveguide, forming the optical part of a transmitter system. Alternately, external light from a fiber can be coupled to an SOI waveguide which couples seamlessly into the photodetector, forming the optical part of the receiver. Applying voltage in the active area of the waveguide, especially made from quantum wells grown on top of re-crystallized germanium, changes its absorption through the quantum confined stark effect, thus altering the intensity of light exiting the active area. This serves as the modulator. When used as a photodetector, the structure collects photocurrent; a diode structure can be operated in reverse bias to collect photocurrent, or it can be used without bias in a photovoltaic mode where it generates voltage and current, and an NIN or PIP structure can be used as a photoconductor. The output waveguide carrying signal from the device used as a modulator can either be routed to a different part of the same chip for detection or can be coupled to an external waveguide (e.g., single or multimode fibers, free space, board-waveguides, fiber image guides and fiber ribbons), using any of the available coupling schemes for off-chip communication. In off-chip communication, the light is routed through external devices (e.g., fiber optics) and is then coupled back to an SOI waveguide, which directs the light to a detector abutting the SOI waveguide. Using the fabrication method outlined herein, the detector is easily aligned with the waveguide. The detector may be operating in the reverse bias PIN configuration allowing it to absorb light to produce photocurrent.

The aforementioned integration scheme can also be used for making active devices in a ring configuration, as shown by ring 120 of FIG. 1E. This can be done simultaneously with the creation of the linear butt-coupled active/passive waveguides outlined above (henceforth, referred to as "in-line" modulator) using exactly the same mask set and process. Only the active area etch pattern is different than the "in-line" active device. In one instance, the ring resonator has quantum wells buried vertically in a PIN diode configuration. The process integration is fully compatible with CMOS foundries and can be used with slight variations before, after, or at strategic points during a standard CMOS process flow.

In addition, the process can be used to grow lasers on SOI and couple them effectively with the SOI waveguide. In the first rendition, active lasing material such as InP, GaAs or other III-V materials well known to those skilled in the art can be seeded from bottom Si using any of the aforementioned techniques such as LPE, RMG or heteroepitaxy. This will yield thin single crystal layers on insulator. Either a homoepitaxy or lattice matched heteroepitaxy on this layer will yield active devices. The entire structure can subsequently be etched forming an efficiently butt-coupled laser and SOI waveguide. A second possibility is to grow lattice matched GaAs on thin single crystal Ge obtained using the above process and etch the entire structure in a waveguide configuration. GaAs and its related compounds (e.g., AlGaAs, InGaAs, GaInNAs) will serve as the lasing material.

Additional components can be constructed on the same substrate using conventional processes. For example, CMOS circuits can be constructed from a silicon/CMOS island 116. These devices can serve to integrate the optical properties of the single-crystalline material with traditional semiconductor (electrical) circuits.

In group III-V semiconductor based active waveguide devices (vertical PIN diodes), the waveguide vertical cladding layers are usually semiconductors. Electrical contacts can be placed on these cladding layers because the mode amplitude significantly deteriorates by the time it reaches the contact, reducing the optical loss due to mode-metal interaction. However, in SOI based active devices, since the cladding is typically non-conducting (such as $SiO_2$), the metal contacts (to P+ and N+ regions) have to be placed on the core region of the waveguide, which contains the entire PIN structure. Because the mode amplitude is quite high here, this can potentially yield a large loss. Several methods can be implemented to minimize this loss.

To make contact to the bottom-doped region of the PIN diode layer, the layer is extended laterally, making it into a ridge waveguide (also called a "foot"). However, since the thickness of the extended bottom layer is very small, it does not significantly impact the coupling with the SOI waveguide, which may be in a strip configuration. The thickness of the bottom extended layer presents a trade-off between resistance and coupling efficiency. Whereas, the lateral distance of the contact from the waveguide core presents a trade-off between resistance and mode loss due to interaction with the metal contact. The bottom contact can also be made through the substrate using the hole, which was used for seeding single crystal SiGe.

To facilitate the implementation of the top contact, a doped polysilicon or poly SiGe layer can be created between the core and the dielectric based cladding. This interlayer, by virtue of its lower refractive index (relative to the core and high doping), serves both as a cladding and a layer that contacts a metal electrode. To further minimize loss, this top poly Si or poly SiGe layer can also be laterally extended and the metal can be contacted away from the core on the lateral extensions. The lateral extension may also be an extension of the top doped layer of the PIN diode.

Another way of contacting the active SiGe based waveguides is to use either doped polysilicon contacts or transparent carbon-nanotube (CNT) based metal contacts. CNTs in certain configuration have been recently shown to be conductive as well as transparent at long wavelengths.

According to another embodiment of the present invention, a method to further enhance butt coupling can be implemented in the case where there is a substantial gap between the SOI waveguide and the active area waveguides. The gap is filled with a dielectric material. In one instance, this can be SiN or poly Si or other high index materials with SiO2 cladding. Further, using etching techniques we can adjust the gap width to be approximately lamda/($4*n_{eff}$) or lamda/($2*n_{eff}$) minimizing any reflections (where neff is the effective propagation index of the gap waveguide). The lamda/($2*n_{eff}$) thickness layer is particularly attractive because the refractive index of that layer is not critical for obtaining substantially zero reflections associated with that layer. The entire active area in the waveguide can also be made into a resonant cavity by appropriately choosing its length.

Figure 2:
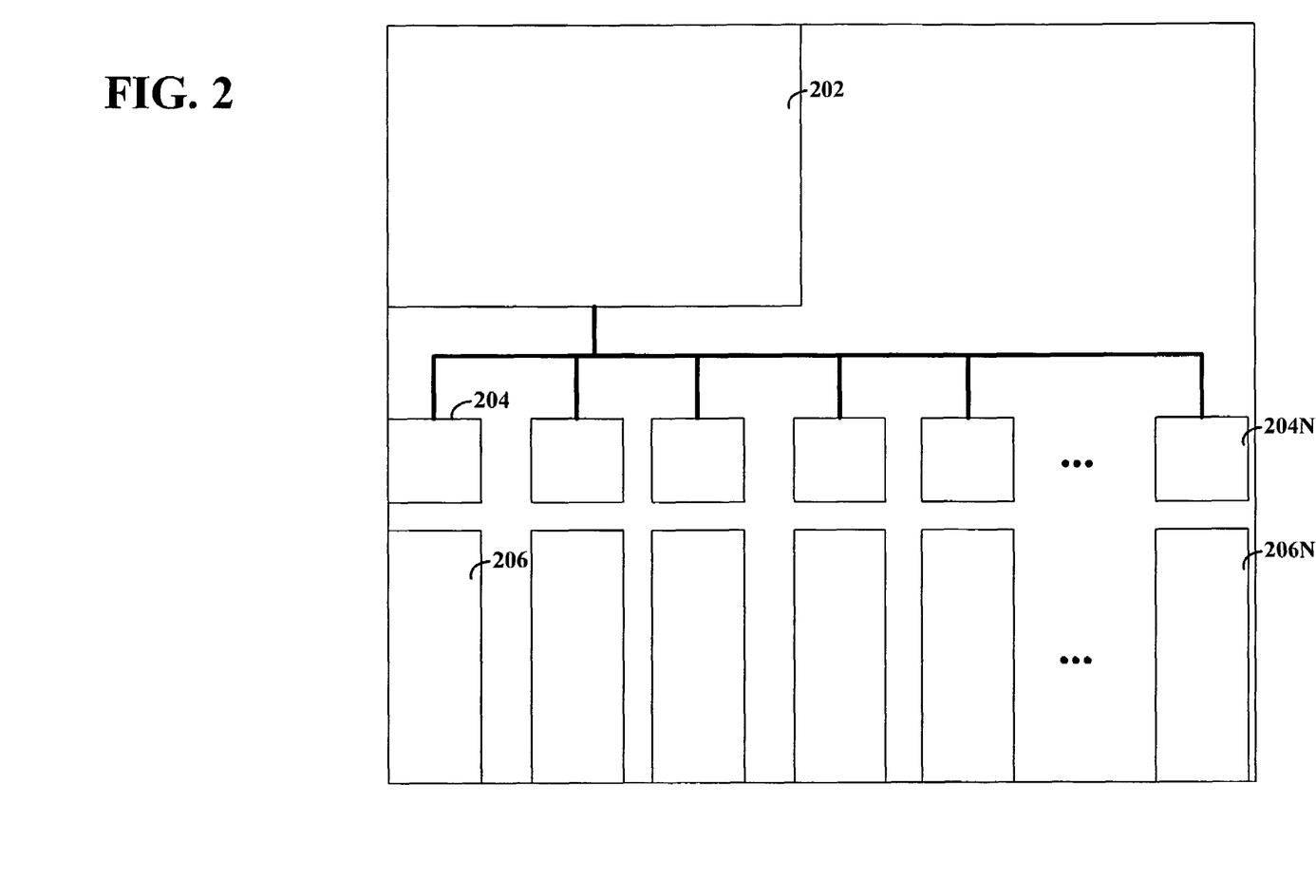
FIG. 2 shows a diagram for an IC that integrates optical communications with electrical circuit components, according to another example embodiment of the present invention.

FIG. 2 shows a diagram for an IC that integrates optical communications with electrical circuit components, according to another example embodiment of the present invention. Active regions 206 to 206N include optical waveguides and active light communicating devices. Processing block 202 uses electrical circuitry (e.g., CMOS) to perform various functions. Interface regions 204 to 204N include control circuitry to interface between active regions 206 to 206N and processing block 202. In one instance, interface regions 204 to 204N serve to amplify electrical signals sent to and from processing block 202, although other signal processing and control functions can be carried out by the interface regions.

The active regions 206 to 206N can be implemented to serve a variety of functions. The following implementations are merely illustrative of a variety of different uses and are not intended to limit the applications of the present invention. In a first implementation, the active regions function as a transceiver for receiving and sending optical communications between different nodes. The nodes can be, for instance, different processors of a system. Each node may have a transceiver connected to an optical bus that provides bidirectional communication between the nodes. Such an optical bus could be shared between multiple nodes, or function as a dedicated bus between any two nodes. In another implementation, the IC can serve as a router or switch for routing data between nodes. In such an implementation, communications between nodes passes through one or more optical routers. Decision circuitry (e.g., processing block 202) routes the information to the correct node. In another implementation, the active regions 206 to 206N can be used to distribute signals throughout the IC. This can be particularly useful for large/dense ICs that may gain from a reduction in power, heat and crosstalk, and that rely upon time dependent signals, such as distributed clocks. In yet another implementation, active regions 206 to 206N function as in-line modulators. Light that passes through the active regions is modulated to carry data provided from processing block 202.

A specific embodiment of the present invention can be implemented using one or more of the following steps to create optical waveguide devices on a SOI substrate. For instance, an optical waveguide device can be implemented by creating a single crystal layer created using RMG or LPE. The single crystal is generated from a seedling location within a hole that exposes an insulator. The process involves removing portion of silicon thereby creating the hole. The single crystal layer is SiGe with Ge concentration varying from 0 to 1, where 1 is pure germanium.

The layer can be created by seeding from bottom silicon substrate or from the silicon sidewall or from the top silicon layer of an SOI wafer. During formation of the single crystal, the SiGe is isolated from the silicon (except for the seeding location). For patterning that occurs after the crystallization of the amorphous SiGe material, control of Si diffusion and the seeding location can be accomplished using a protective dielectric layer to isolate the SiGe material from the silicon. In another instance, isolation includes patterning of the SiGe material away from the silicon prior to crystallization. Accordingly, patterning of the SiGe material can be implemented before or after crystallization of the amorphous SiGe material.

After the (re)crystallization of the amorphous SiGe material, various optical device can be created. One such device is sometimes referred to as a bulk detector. To implement a bulk detector, the process produces a crystallized layer that is thick enough to be of the comparable height with the core of the SOI waveguide. An example of another detector is a quantum well detector. Quantum well devices differ from bulk devices in that they generally require the formation of one or more very thin semiconductor layers. Accordingly, one process creates a SiGe quantum well detector using epitaxial growth on top of crystallized layer. Similarly, epitaxial growth from the SiGe crystallized layer can be used to create quantum well modulators.

Another potential device is a light generator, such as a laser. According to a one process, lattice matched epitaxial growth of a lasing material (e.g., GaAs) on top of crystallized germanium layer produces the light generating portion of the device. According to another process, SiGe quantum wells generate the desired light.

Specific examples of the SiGe devices discussed above include lateral or vertical PIN, NIN, PIP and PN devices. Such devices can be constructed using epitaxial growth from the SiGe crystallized layer, in-situ doping of the SiGe crystallized layer and ion implantation of either the SiGe crystallized layer or epitaxial grown layers.

Coupling of the SOI (passive) and the SiGE active (detector, modulator, laser) can be accomplished using a variety of methods and can produce a variety of different devices. For example, etching of passive and actives produces two types of coupling: in-line (butt coupled) and evanescent coupled resonant cavities (e.g., ring or disk shaped active components). In a particular instance, a single etch produces self-aligned active and passive components. This etch can be used to produce both in-line and evanescently coupled devices.

According to other specific embodiments, different methods are implemented to improve upon the contacts and coupling of the optical devices formed using the aforementioned processes. For instance, a process may generate a waveguide shape that includes a portion (foot or head) for contacting away from the mode of the waveguide. Such a "foot" or "head" includes a relatively thin portion that extends from the bottom or top of the active area. Other contacts to interface with the active region include a different type of semiconducting material (e.g., polysilicon) or carbon nanotube contacts (both transparent and conductive).

According to another example embodiment, improvements of the coupling efficiency between passive and active areas of in-line coupled devices can be accomplished using a dielectric material between the devices. Such dielectric material may be tailored to the specific application by controlling the thickness of the dielectric relative to the wavelength of the light used by the application and by selecting a dielectric with a relatively high index.

Using the various methods described herein materials other than SiGe, such as type III-Vs semiconductors, could be seeded from silicon. For example, GaAs or similar light generating material could be used to create a laser directly on the seeding material. Thus, the light generating material can be integrated with the SOI waveguide as discussed herein.

In other devices that do not require an SOI structure or an insulator layer for the entire device, the optical portion of the device can be located within various other structures. For example, portions of the device could include other structures depending upon the application. Such devices could be particularly useful for integrating optical properties of the single-crystal semiconductor and aligned waveguide with an assortment of different components and structures (e.g., conventional semiconductor structures).

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, which is set forth in the following claims.

What is claimed is:

1. A method for manufacturing a semiconductor device for one of detecting, modulating and emitting light, the semiconductor device including a silicon material over an insulator layer which in turn is over a Si-based substrate, the method comprising:
    forming a growth region that is isolated from a silicon portion of the silicon material over the substrate, and that extends from a silicon-based seeding area;
    depositing a semiconductor material on the Silicon-based seeding area and in the growth region;
    forming a single crystalline material from the deposited semiconductor material by heating and cooling the deposited semiconductor material while directing growth of the semiconductor material from the Silicon-based seeding area and through an opening sufficiently narrow to mitigate crystalline defects; and
    forming a light-communicating device having a waveguide portion aligned with a portion of the single crystalline material by etching the silicon material over an insulator layer and etching the single crystalline material.

2. The method of claim 1, wherein the semiconductor device is a Silicon-on-Insulator device having the Silicon material separated from the Si-based substrate by the insulator layer, and wherein the growth area is partially defined by a protective dielectric material that isolates the growth region from the silicon portion of the silicon material.

3. The method of claim 1, further comprising the step of creating a diode by one of doping the single crystalline material and epitaxial growth from the single crystalline material.

4. The method of claim 1, wherein the growth region is partially defined by a gap that isolates the growth region from the silicon portion of the silicon material.

5. The method of claim 1, wherein the narrow opening is formed by deposition of a material to form a crucible that holds the semiconductor material.

6. The method of claim 1, wherein the deposited semiconductor material is one of Germanium and Silicon-Germanium.

7. The method of claim 1, wherein the deposited semiconductor material is a material having a coefficient of absorption that is greater than a coefficient of absorption for silicon at a wavelength of the light, wherein the light has a wavelength greater than about 1 micrometers.

8. The method of claim 1, further including the step of adjusting a size of a gap between the waveguide portion and the aligned portion of the single crystalline material in response to a wavelength of the light.

9. The method of claim 1, wherein the step of forming a light-communicating device includes forming a laterally extended foot or head area for electrically contacting the aligned portion of the single crystalline material.

10. A method of manufacturing a semiconductor device for one of detecting, modulating and emitting light, the method comprising;
    exposing a portion of an insulating layer by removing a silicon portion of a silicon layer of a silicon-on-insulator wafer, leaving a remaining silicon layer;
    isolating the to be deposited semiconductor material from interaction with the silicon layer;
    exposing a silicon portion by removing a portion of the insulating layer exposed by the step of exposing a portion of an insulating layer or removing a portion of the protective dielectric layer;
    depositing a semiconductor material on the exposed portion of the insulating layer and the exposed portion of the silicon portion;
    depositing a crucible dielectric layer over the deposited semiconductor material to encapsulate it;
    transforming the semiconductor into a single crystal film by heating and cooling the deposited semiconductor material; and
    creating a light path that includes an SOI waveguide and a portion of the single crystal film.

11. The method of claim 10, further including a step of creating a diode by doping the single crystal film.

12. The method of claim 10, further including a step of creating a diode by epitaxial growth from the single crystal film.

13. The method of claim 10, further including a step of protecting the device using passivation of the SOI waveguide area and an active area that includes the single crystal film.

14. The method of claim 10, further including the step of placing a dielectric in a gap between the waveguide portion and the aligned portion of the single crystalline material, wherein the dielectric is a relatively high index material.

15. The method of claim 10, wherein the portion of the single crystal film is an optical component of one of an in-line and a ring-oscillator optical device.

16. The method of claim 10, wherein the step of transforming the semiconductor into a single crystal film includes using one of a rapid-melt-growth process and a liquid phase epitaxy process.

17. The method of claim 10, further including the steps of controlling the size of a gap between the SOI waveguide and the portion of the single crystal film such that the gap has a width that is a function of a wavelength of light to be communicated and a propagation index of the gap and filling the gap with a dielectric material.

18. The method of claim 10, wherein the step of creating a light path includes the step of simultaneously etching the silicon layer and the single crystal film.

19. The method of claim 10, wherein the step of creating a light path includes the step of etching the silicon material over the insulator layer and etching the single crystalline film.

20. The method of claim 10, wherein the step of creating a light path includes the step of forming a laterally extended foot or head area for electrically contacting an aligned portion of the single crystalline film.

* * * * *